United States Patent [19]

Tomizawa

[11] Patent Number: 4,688,248
[45] Date of Patent: Aug. 18, 1987

[54] PAY TELEVISION SYSTEM

[75] Inventor: Akimori Tomizawa, Tokyo, Japan

[73] Assignee: Clarion Co., Ltd., Tokyo, Japan

[21] Appl. No.: 714,152

[22] Filed: Mar. 20, 1985

[51] Int. Cl.$^4$ .................. H04N 7/167; H04N 1/00; H04N 7/10; H04H 1/00

[52] U.S. Cl. ....................... 380/20; 358/86; 455/5

[58] Field of Search ............... 358/114, 86, 122, 123; 455/3, 4, 5

[56] References Cited

U.S. PATENT DOCUMENTS

| | | | |
|---|---|---|---|
| 4,475,123 | 10/1984 | Dumbauld et al. | 358/114 |
| 4,530,008 | 7/1985 | McVoy | 358/114 |
| 4,538,174 | 8/1985 | Gargini et al. | 358/86 |

Primary Examiner—Stephen C. Buczinski
Assistant Examiner—Melissa L. Koltak
Attorney, Agent, or Firm—Flynn, Thiel, Boutell & Tanis

[57] ABSTRACT

A pay television system generally comprises a signal generating center, signal distributers and subscriber devices. The center produces and combines a television signal and a control signal and supplies the combined signal to a common cable, and each distributer includes subscriber units which receive the television signal through a first filter and control units which receive the control signal through a second filter. Each control unit which receives a tuning signal from a subscriber controls a corresponding one of the subscriber units to supply the subscriber with the television signal responsively to the control signal and according to the corresponding subscription, and each subscriber device includes at least one tuner which transmits the tuning signal indicating a requested channel to the signal distributer and a television receiver which is supplied with the requested television signal via the tuner when it coincides with the television signal supplied from the signal distributer in reply to the tuning signal.

3 Claims, 16 Drawing Figures

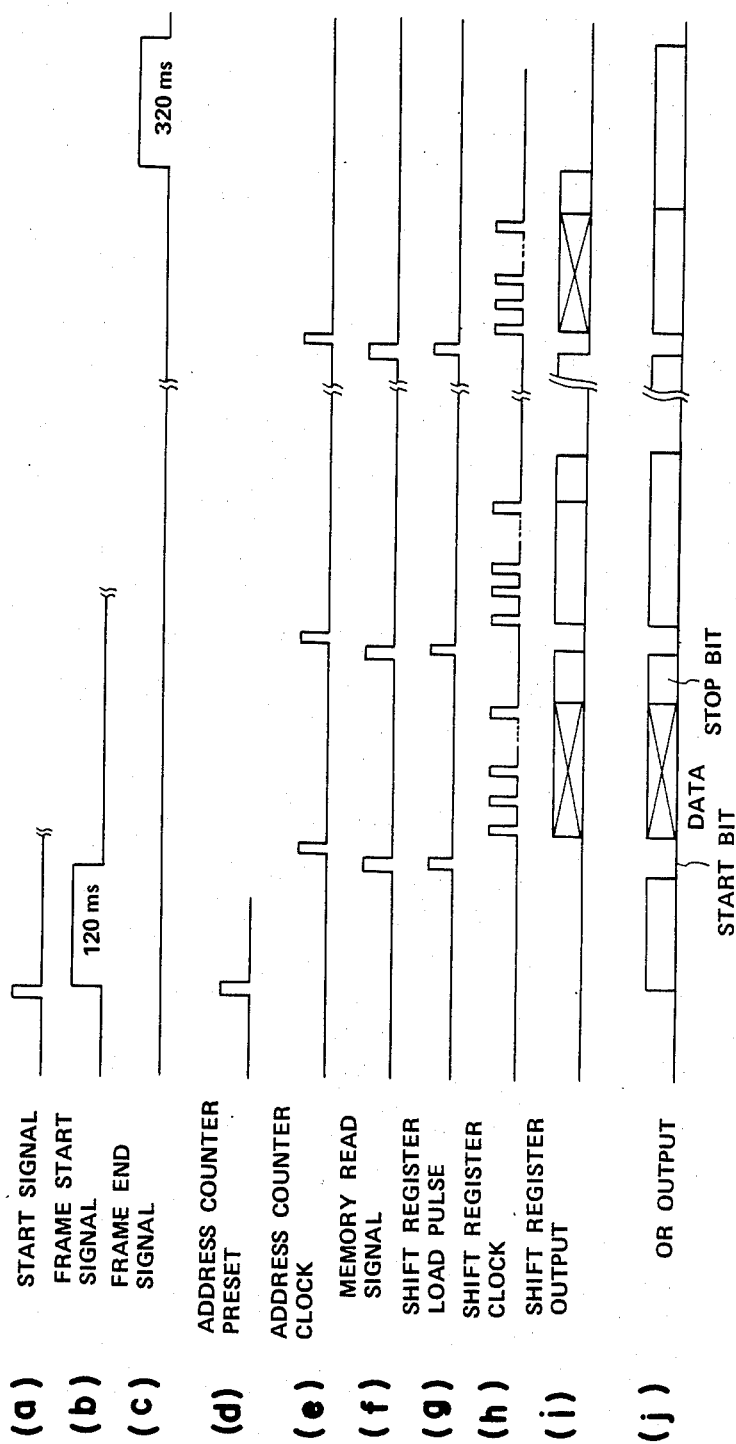

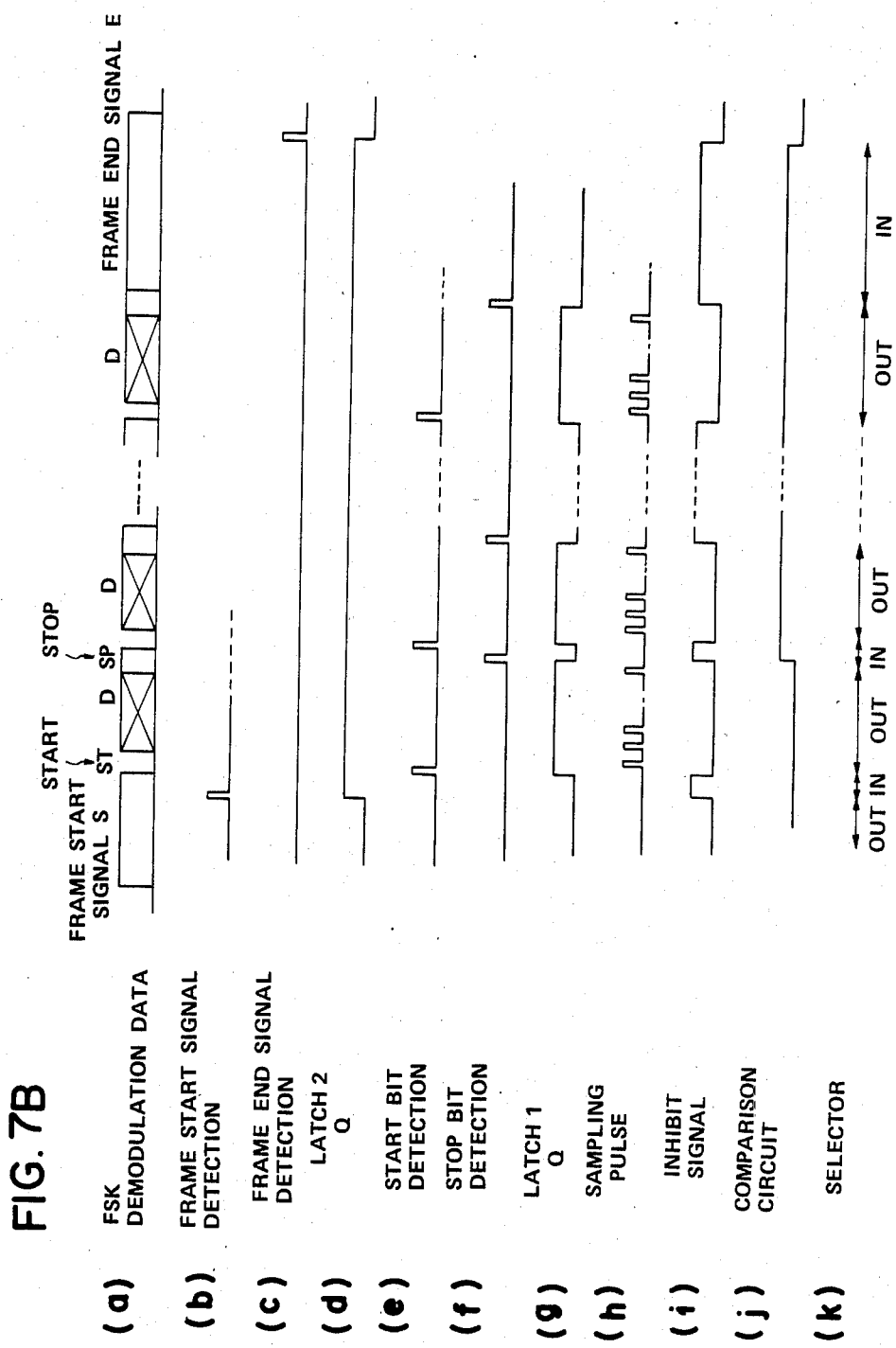

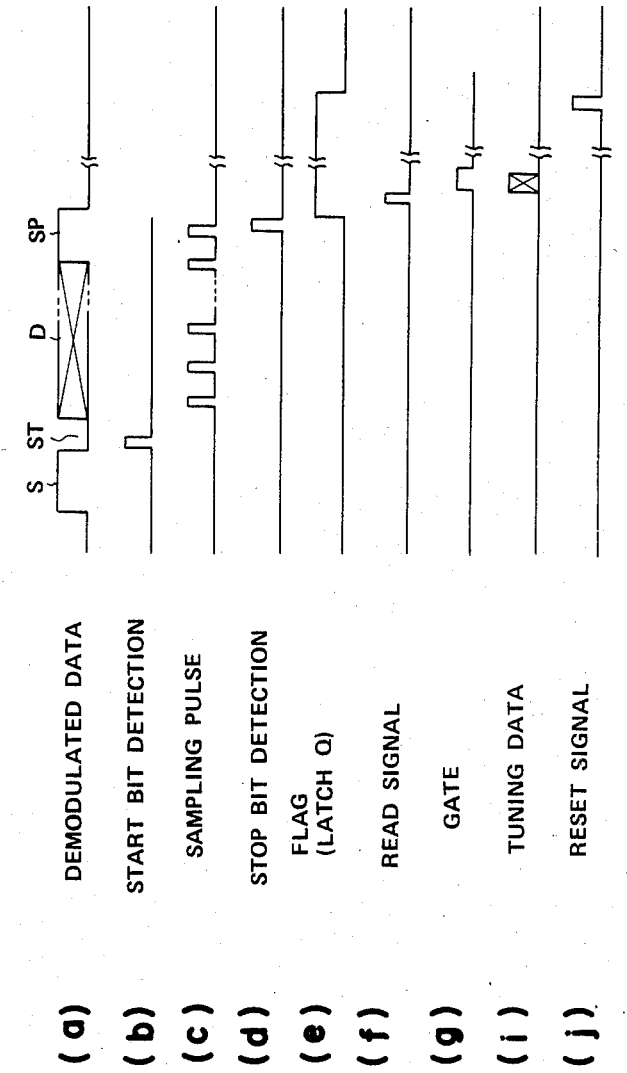

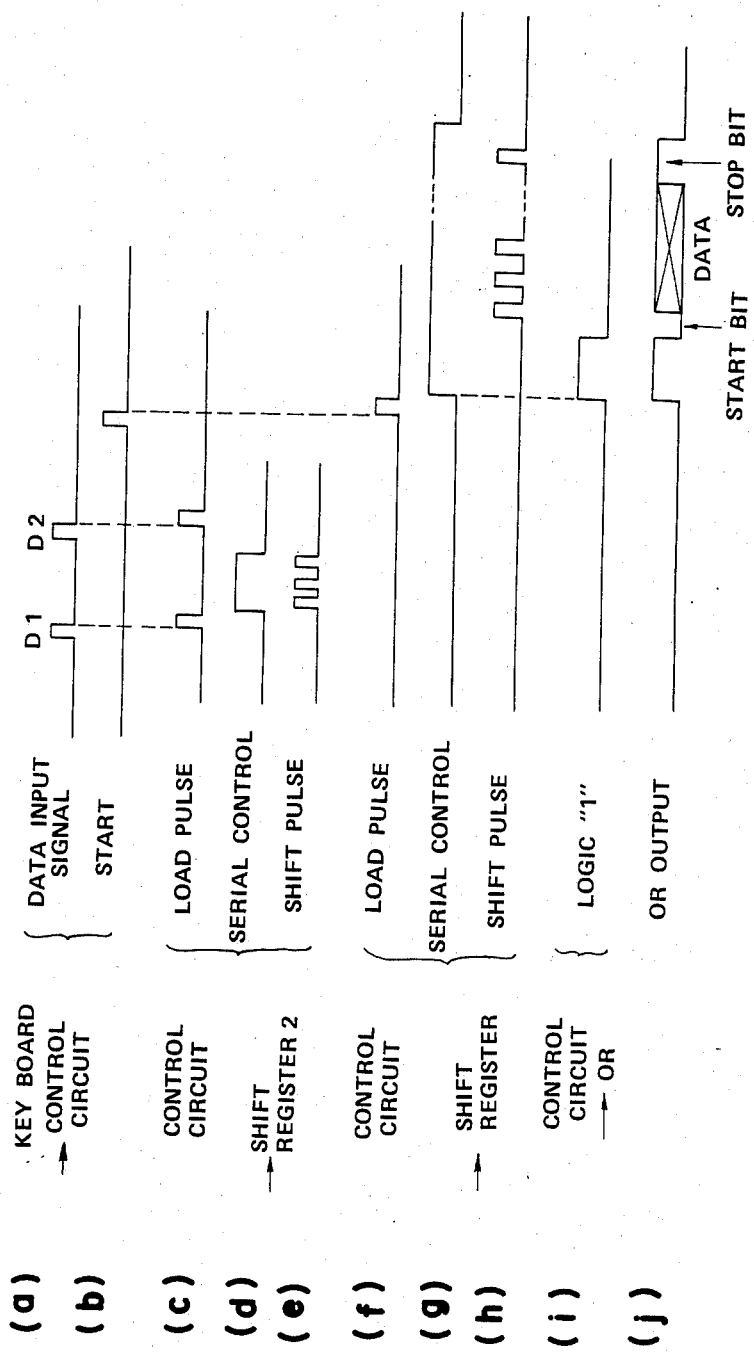

PAY TELEVISION SYSTEM

FIELD OF THE INVENTION

This invention relates to a pay cable television (CATV) system, and more particularly to one type called "addressable system" which includes an addressable converter installed outdoor to provide a signal of a television channel selected by a subscriber's indoor remote control.

Some pay cable television systems provide programs for an additional fee on top of the basic fee. Some of them are arranged so that the transmitter's station can increase, change or decrease the pay channels the subscriber's stations can receive, in accordance with changes in individual subsription agreements. They are called "addressable system".

One format of the addressable system is arranged so that the transmitter's station provides a scrambled television signal and each subscriber's terminal device descrambles the received signal to extract the regular television signal. In this case, the transmitter station superposes a code signal unique to each subscriber on the scrambled television signal, and transmits it together. The subscriber's terminal device generally comprises a converter block, an addressable block and a descramble block. When the subscriber selects a pay channel, a signal corresponding thereto passes through the converter block and is applied to the addressable and descramble blocks. If the selected channel is subscribed by the subscriber, the signal must include the unique code. The addressable block detects the unique code and enables the descramble block to descramble the signal. In contrast, if the selected channel is not subscribed, the signal does not include the unique code. Therefore, the addressable block cannot detect the unique code nor enable the descramble block. Thus the addressable block simply produces the television signal still scrambled.

Another format of the addressable system employs filters or traps in each subscriber's terminal device to simply enter subscribed channels or reject nonsubscribed channels. This control is effected by a control signal supplied from the transmitter station. Thus each subscriber's television receiver can receive a subscribed channel directly or via a converter, but cannot receive nonsubscribed and rejected channels even if the subscriber effects an operation to select them. This is called "addressable tap system" or "addressable trap system". In this system, however, each subscriber can readily receive nonsubscribed channels by simply bypassing the terminal device and connecting the television receiver to the transmitted signals directly or via a converter. To avoid this, the terminal device must be placed inside a wall or at the tap-off point on an outdoor pole where the subscriber cannot readily touch it.

The third format of the addressable system employs an addressable converter (hereinafter simply called "converter") installed outdoors so as to be remote-controlled by an indoor subscriber to select a channel. The agreed subscription to the subscriber is recorded in a nonvolatile memory, etc. and may be changed by a signal from the transmitter's station. When the subscriber effects the tuning operation, the selected channel is compared to the stored subscription data in the memory or other means. If the comparison acknowledges that the selected channel is subscribed, the converter is actuated to convert the received signal into the regular television signal. However, if the selected channel is not subscribed, the converter does not effect the proper conversion nor produce the signal of the selected pay channel. The outdoor installation of the converter provides the advantages that the subscriber cannot readily touch it for unfair use and that a simply addressable block may be used in common for plural subscribers to reduce the cost of the entire system. Each tuner, however, must be placed indoor.

Among the above-presented systems, the present invention is directed to the third format of the addressable system.

In the prior art third system, however, a converter and a cable must be provided for every subscribed television set. If one subscriber makes different subscription agreements for two or more television sets all placed in his house, a single converter may be commonly used, provided a tap-off means is combined therewith to form a signal distributer. However, as far as the entrance cable is concerned, two or more cables corresponding to the number of the television sets must be conducted from the signal distributer, and this implies a considerable installation expense on the subscriber or the transmitter.

OBJECT OF THE INVENTION

It is therefore an object of the invention to provide a pay television system which alleviates the drawbacks involved in the prior art system.

Another object of the invention is to improve in particular the third type of pay television system.

SUMMARY OF THE INVENTION

In accordance with the invention, there is provided a pay television system comprising:

a signal generating center including a television signal transmitter which supplies a television signal, a control signal transmitter which supplies a control signal, and an adder which combines said television signal and said control signal into a combined signal;

at least one signal distributor including a first filter which separates said television signal from said combined signal, a second filter which separates said control signal from said combined signal, at least one subscriber unit which receives said television signal from said first filter, and at least one control unit which receives said control signal from said second filter;

at least one subscriber device including at least one tuner which transmits to said signal distributer a tuning signal corresponding to a television channel requested by a subscriber, and at least one television receiver which receives said television signal supplied from said signal distributer via said tuner in reply to said tuning signal; and a common cable connecting said signal generating center to said signal distributers;

said control unit controlling said subscriber unit upon receipt of said tuning signal in response to said control signal to supply said subscriber unit with said television signal when said requested channel is involved in the subscription agreed to by said subscriber.

The invention will be better understood from the description given below, referring to some preferred embodiments illustrated.

BRIEF DESCRIPTION OF THE DRAWINGS

FIG. 6B is a timing diagram showing the correlation between various operations in the control signal transmitter of FIG. 6A;

FIG. 7B is a timing diagram showing the correlation between various operations of the subscription data memory of FIG. 7A;

FIG. 8B is a timing diagram showing the correlation between various operations of the tuning data memory of FIG. 8A;

FIG. 9B is a timing diagram showing the correlation between various operations of the tuning signal generator of FIG. 9A;

DETAILED DESCRIPTION

Figure 1:
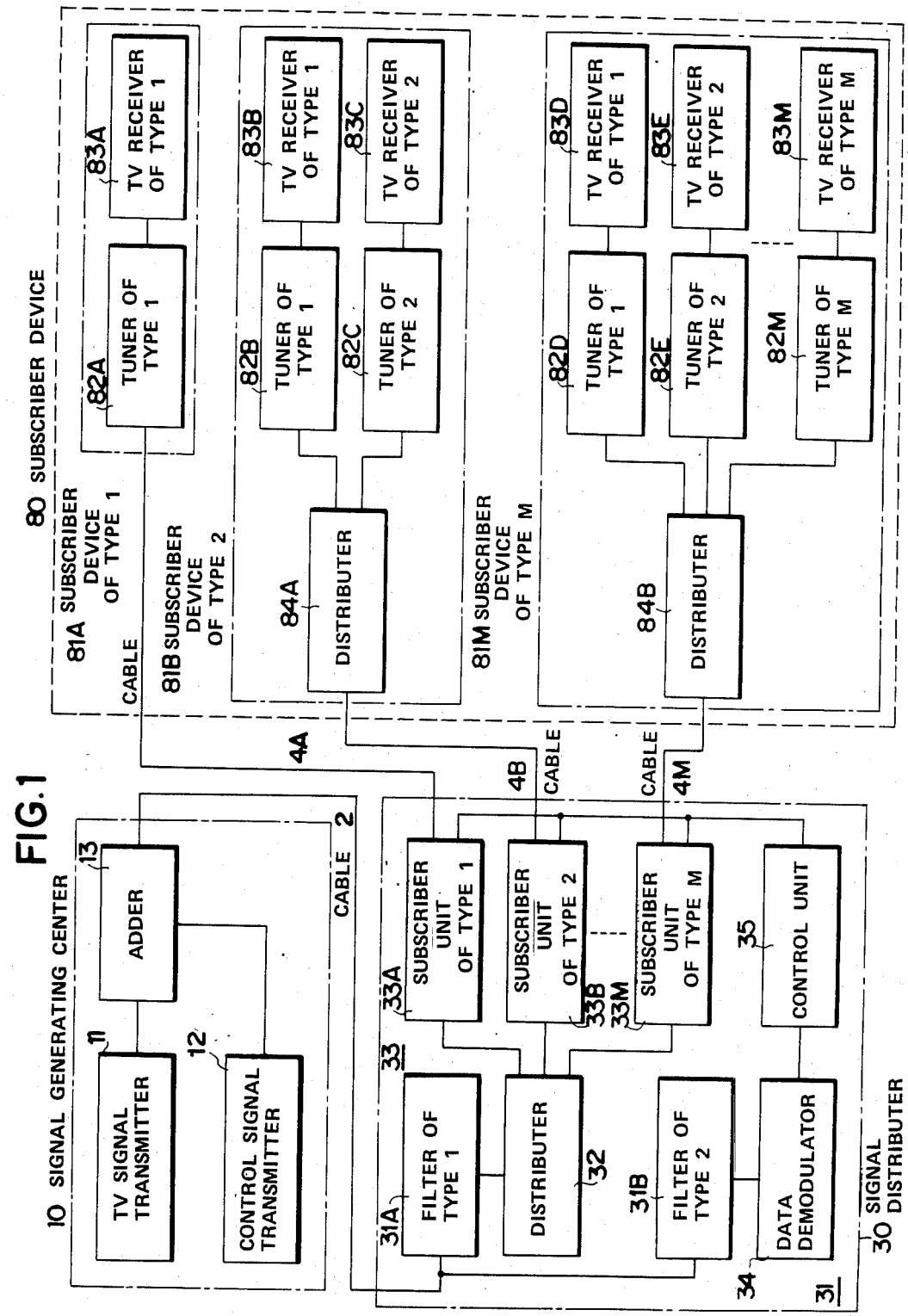
FIG. 1 is a block diagram showing a general arrangement of a pay television system embodying the invention.

FIG. 1 is a block diagram which shows a general arrangement of a pay television system embodying the invention. Reference numeral 10 designates a signal generating center, 30 is a signal distributer which receives a signal from the signal generating center 10 via a cable 2, and 80 generally denotes the subscriber devices which are supplied with the signal from the signal distributor 30 via respective cables 4 (4A, 4B and 4M).

The signal generating center 10 generally comprises a television signal transmitter 11 which provides television signals, a control signal transmitter 12 which generates control signals indicating data such as pay channel numbers subscribed by individual subscribers, and an adder 13 which combines both signals and transmits them to the signal distributer 30 via the cable 2.

The signal distributer 30 generally comprises a first type filter 31A, a distributor 32, a first type subscriber unit 33A, a second type subscriber unit 33B, and an Mth type subscriber unit 33M, a second type filter 31B, a data demodulator 34 and a control unit 35.

Figure 10:
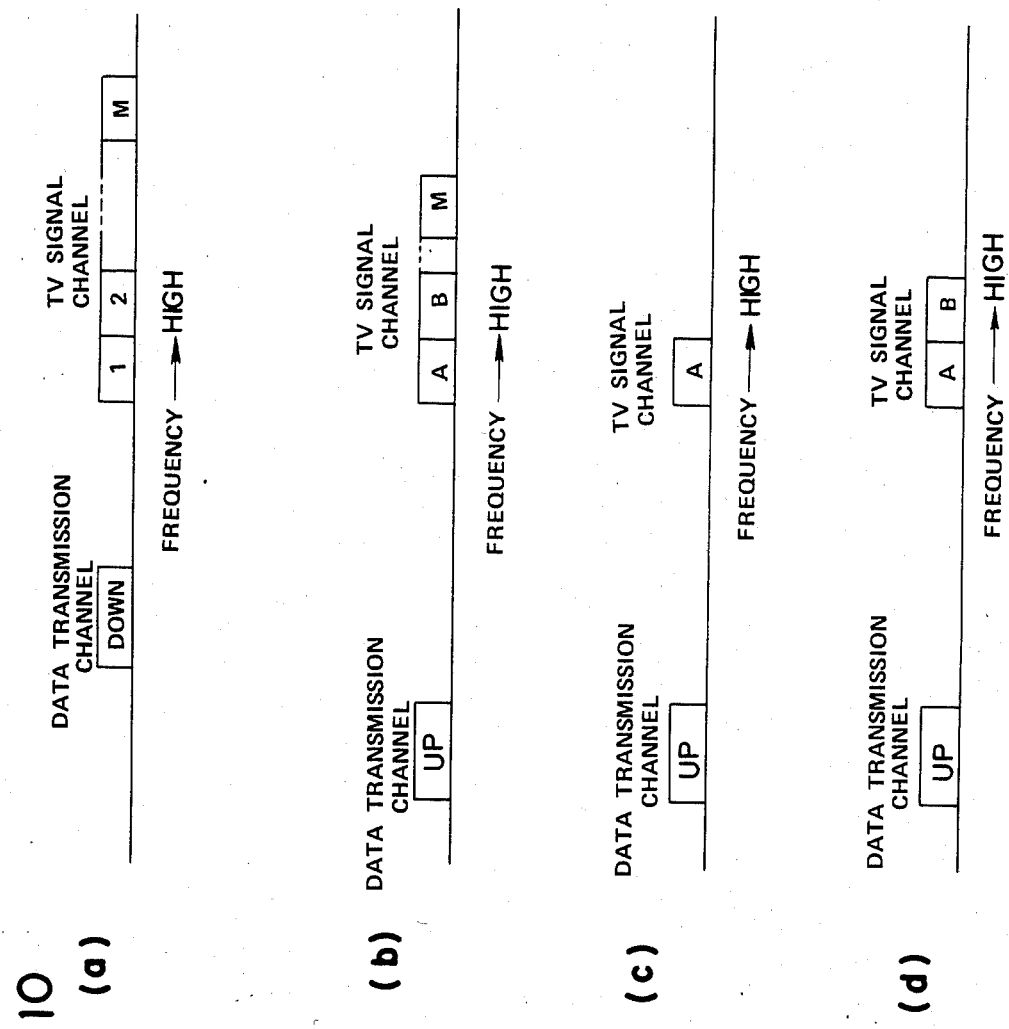
FIG. 10 is a frequency chart showing signal placements in several up and down data transmission formats.

The first type filter 31A separates the television signal in the received composite signal and transmits it to the distributer 32 and thence to the subscriber units 33A, 33B and 33M (See (a) of FIG. 10 which shows that the filter transmits television signals of first to Mth pay channels).

Figure 2:
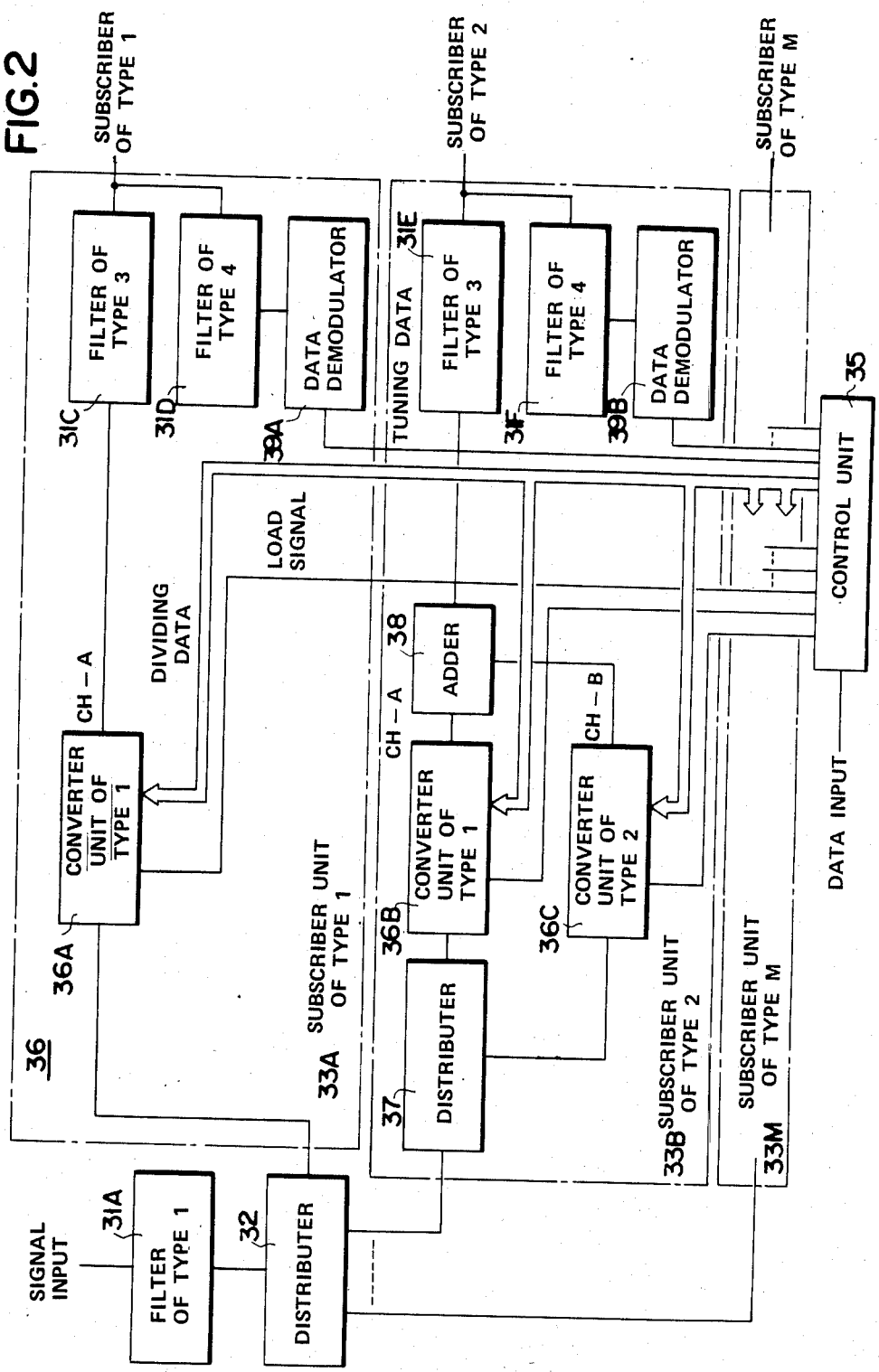
FIG. 2 is a block diagram of a subscriber unit in the system of FIG. 1.

The distributer 32 is of a known type to distribute the separated television signal to the respective subscriber units. The first type subscriber unit 33A is associated with a first type subscriber device 81A to supply it with the separated television signal. The first type subscriber device 81A is used for a subscriber who makes a single subscription agreement for one television set, and effects a frequency conversion of a television signal of a subscribed and requested pay channel into a predetermined channel (designated by CH-A in FIG. 2). The first type subscriber device 81A concurrently demodulates the data from a tuner 82A and applies it to the control unit 35. The second type subscriber unit 33B is associated with the second type subscriber device 81B for a subscriber who makes two different subscription agreements for two television sets. Outputs from the second type subscriber unit 33B is frequency converted to two predetermined channels (designated by CH-A and CH-B in FIG. 2). The Mth type subscriber unit 33M is also associated with the Mth type subscriber device 81M similarly. The second type filter 31B extracts only the control signal in the received signal from the center 10 and applies it to the data demodulator 34 (This is the downstream portion of the data transmission channel in Graph (a) of FIG. 10. The term downstream means a transmission from the center 10 to the signal distributer 30).

Figure 3:
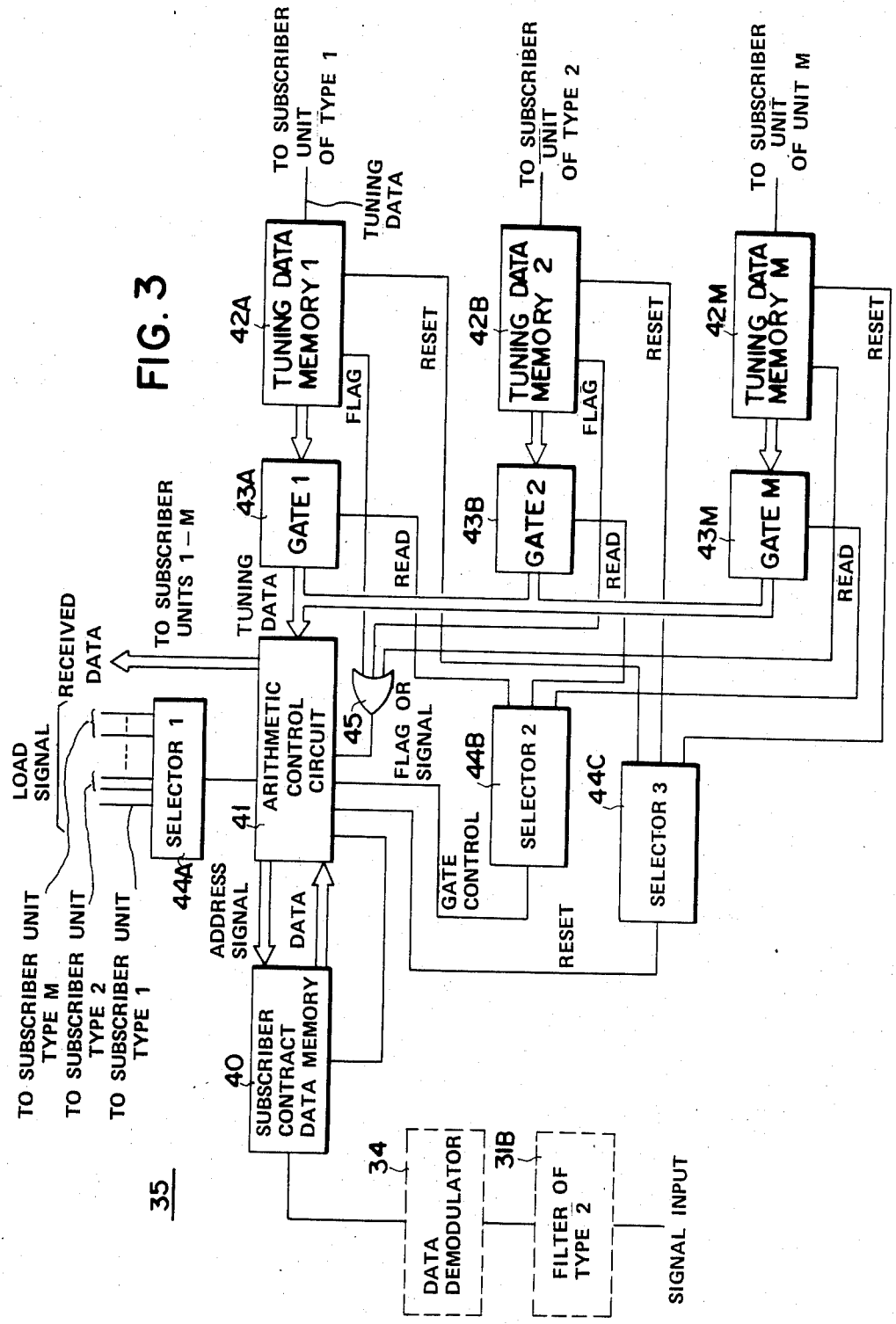
FIG. 3 is a block diagram of a control unit in the system of FIG. 1.

The control unit 35 stores the control signal from the signal generating center 10, receives a tuning signal from a subscriber via the subscriber unit 33, and controls the unit 33 to put on a given cable 4 the subscribed and requested television signal. A detailed diagram of the control unit 35 is shown in FIG. 3. A subscription data memory 40 stores the control signal from the center 10, and produces a predetermined data under control of an arithmetic control circuit 41. Each tuning data memory 42 stores a tuning data which is supplied from the corresponding subscriber unit 33 responsively, and can the subscriber's tuning operation to give the data to the arithmetic control circuit 41.

Figure 4:
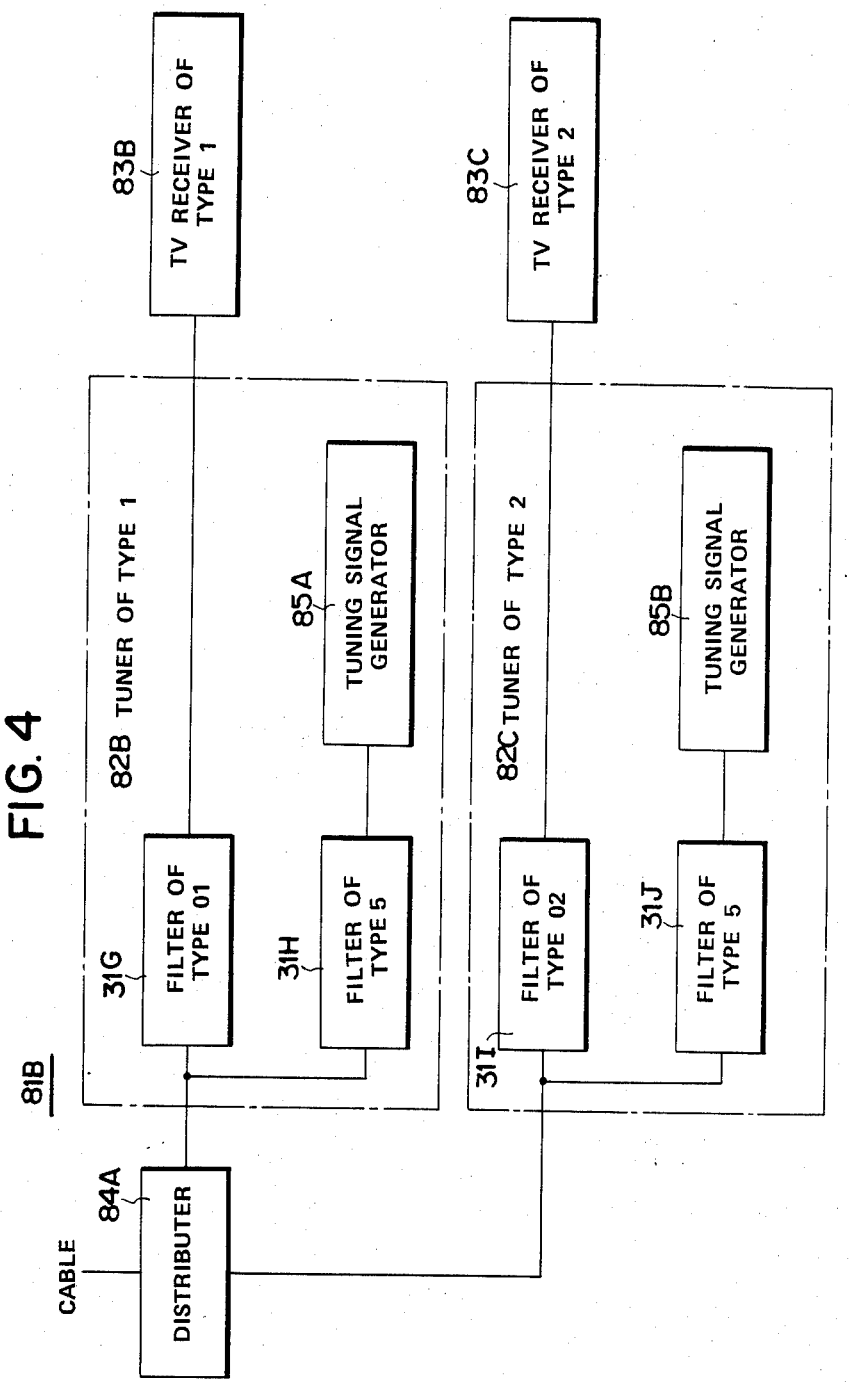
FIG. 4 is a block diagram of a second type subscriber device in the system of FIG. 1.

The circuit 41 is preferably made in the form of a microcomputer widely used at present. Its essential function is to respond a flag of logic "1," which means that a subscriber has effected a tuning operation by checking all data in all the tuning data memories 42 to identify the subscriber who requested the television signal. Each tuning data includes a flag signal to be entered in an OR circuit 45 so as to allow the arithmetic control circuit to read and operate on the data only when the flag signal of logic "1" is included. Therefore, each tuning data memory 42 must be cleared in an adequate time after being processed. A third selector 44C is controlled to produce a reset signal to clear a selected tuning data memory 42. The arithmetic control circuit 41 detects the identification (ID) number unique to a corresponding tuner 82 and the selected channel number, which are both included in the received tuning data, and compares them with the subscription data stored in the memory 40. If it is acknowledged that the selected channel is subscribed to by the subscriber, the circuit 41 calculates a reception data enabling reception of the regular television signal. The circuit 41 applies the reception data to the respective subscriber units 33 and subsequently controls the first type selector 44A to supply a load signal only to the corresponding converter unit 36 (FIG. 2) of the acknowledged subscriber unit 33 (FIG. 2) and have it store the reception data therein. The first through Mth gates 43 are controlled by the arithmetic control circuit 41 so that only the tuning data memory 42 associated with a selected one of the gates 43 puts its output on the tuning data bus at any given point in time. The entire arrangement of the subscriber system block 80 depends on how many television sets are entered in different subscription agreements. However, the basic construction is such that the respective television receivers are connected to the cables 4 via the respective tuners 82. The first to Mth type subscriber devices 81 each comprising the tuner 82 and the television receiver 83 are different in channel to path through. Assuming that the first type subscriber unit 33A converts the entered signal into channel A, the first type tuner 82A, transmits only the channel A provided the first type television receiver 83A is tuned at channel A. Assuming that the second type subscriber unit 33B supplies two channels B and C, the first type tuner 82B transmits channel B while the second type tuner 82C, transmits channel C provided the first and second type television receivers 83B and 83C are tuned at channel B and C, respectively. FIG. 4 shows a detailed arrangement of the second type subscriber device 81B wherein the channels to pass through are determined by a first type filter 31G and a second type filter 31I.

Another function of the subscriber system block 80 is to supply the signal distributer 30 with respective tuning signals each including a unique ID number and a channel number (this is called "upstream" data transmission). More specifically, tuning signal generators 85A and 85B each generate a tuning signal and apply it to the cable 4. Fifth type filters 31H and 31J each are used to change the frequency of the tuning signal from that of the entered television signal, and they form the upstream of the data transmission channel in Graphs (b) to (d) of FIG. 10.

Signal flows between and control operations of the respective circuit elements are explained hereunder.

(1) Control of a Signal from the Signal Generating Center to the Signal Distributer:

FIG. 7B shows the format of the signal transmitted from the center 10 to the signal distributer 30. The transmission format for each signal distributer 30 comprises a frame start signal S, data signals D (identification number and subscription agreement data), and a frame end signal E. Each data signal D is put between a start bit ST and a stop bit SP. The frame start signal S and the frame end signal E each have the same logic value "1" as the stop bit SP, and they have sufficiently longer durations than one word of each data D. Additionally, the frame end signal E has a sufficiently longer duration than the frame start signal S to facilitate discrimination therebetween. The identification number in the data D shows which signal distributer 30 should receive the data from the center 10. In this connection, each signal distributer 30 has a unique identification number.

Figure 6A:
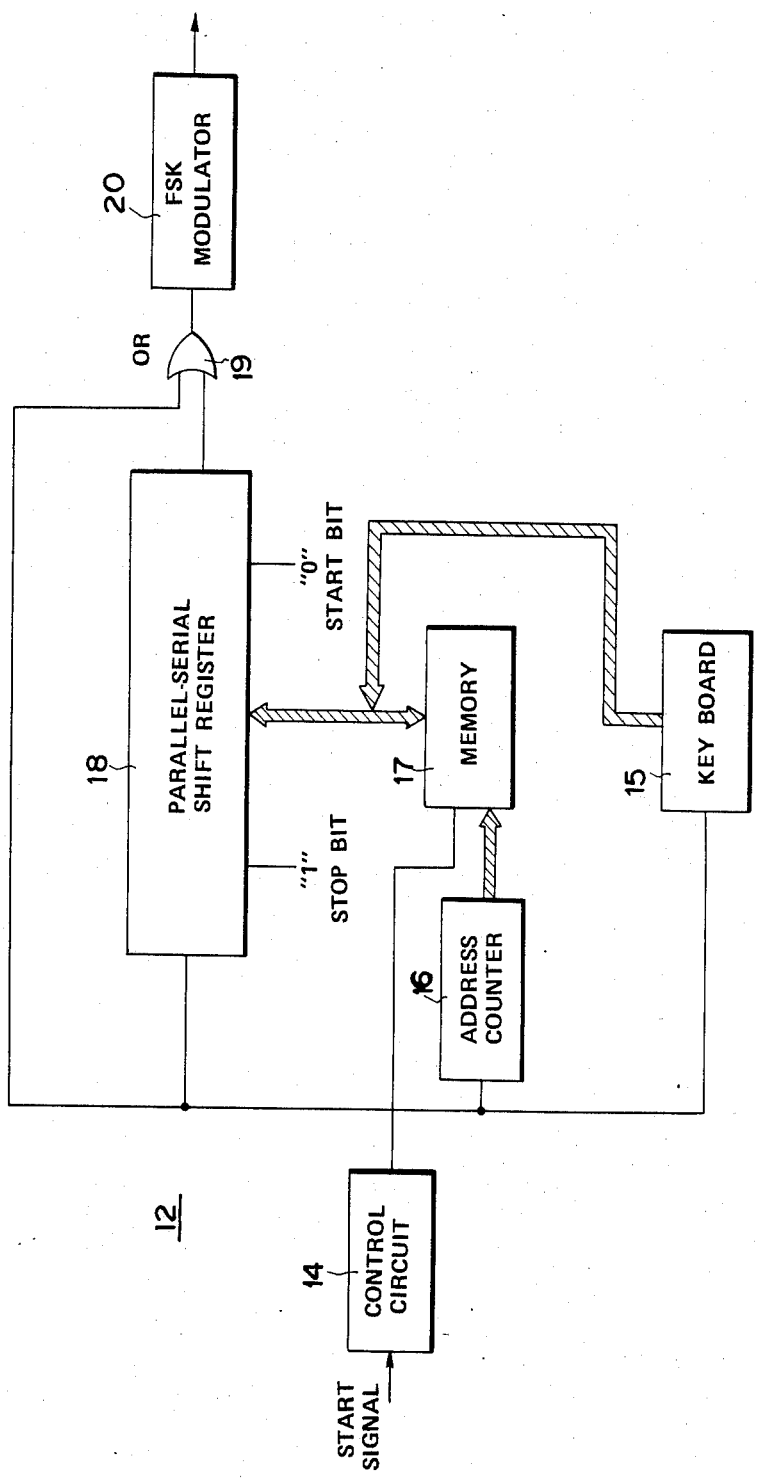
FIG. 6A is a block diagram of a control signal transmitter in the system of FIG. 1.

FIG. 6A shows an arrangement of the control signal transmitter 12 in the signal generating center 10, and FIG. 6B shows the timing between its major operations. In FIG. 6A, a given data is entered in a memory 17 through a key board 15 or other similar means not illustrated. (After completion of the data transmission to one signal distributer 30, a data for the next signal distributer is entered in the memory 17 and subsequently transmitted thereto. This is repeated to transmit the data to all the necessary signal distributers.) More specifically, a control circuit 14 drives an address counter 16 in response to outputs from the key board 15 and concurrently enters a memory writing signal (data) in the memory 17. If a start signal as shown by (a) in FIG. 6B is supplied while the memory stores the predetermined data, the control circuit 14 supplies a frame start signal in the form and timing of (b). The frame start signal is such that the logic "1" continues for 120 ms, for example. One frame corresponds to the full data for one signal distributer. The frame start signal is the leader of the frame while the frame end signal is the trailer of the same. When two or more frames are transmitted in sequence, it will be effective to interpose the logic "0" longer than 1 bit between the frame end signal of one frame and the frame start signal of the subsequent frame.

Concurrently with the start, the address counter 16 is preset at a given value as shown by (d) in FIG. 6B. When the frame start signal is finished, the control circuit 14 produces a memory read signal as shown by (f) in FIG. 6B so that a selected data word in the memory 17 accompanied by start and stop bits is entered in a predetermined position of a parallel-serial shift register 18 by shift register load pulses which are shown by (g) in FIG. 6B and which are supplied to the register 18 so as to effect a parallel load operation. Subsequently, the shift register 18 is supplied with shift register clock pulses shown by (h) in FIG. 6B at a predetermined period. At that time, the shift register 18 is controlled to effect a serial operation, and produces output pulses shown by (i) in FIG. 6B. Finally, an OR circuit 19 produces pulses shown by (j) in FIG. 6B.

When one unit of data comprising a start bit, a data word and a stop bit is sent out, a subsequent data word in the memory 17 is transmitted to the parallel-serial shift register 18. Control of these memories which could be different according to the type and arrangement thereof is already known in the prior art and hence is not explained here in detail. Said series of data processing in the control signal transmitter 12 is repeated until all the data for the outstanding signal distributer 30 is sent out. The end of the data transmission can be acknowledged by arranging the control circuit 14 to count the number of data word entered using the key board 15. Subsequently, the control circuit 41 supplies via the OR circuit 19 a frame end signal shown by (c) in FIG. 6B with a continuous logic "1" which continues for more than 300 ms, i.e. 320 ms, for example. When the transmission of the frame end signal is finished, a logic "0" is provided. If a further start signal as shown by (a) in FIG. 6B is provided, the series of the data processing and transmission is repeated. The output from the OR circuit 19 is modulated by an FSK (frequency shift keying) modulator 20 into an FSK signal and is put on the cable 2 after being amplified, if necessary, together with the television signal for supply to the signal distributer 30.

The FSK signal entered in the signal distributer 30 passes through the first type filter 31B (FIG. 1) and enters into the data demodulator 34, which may be an FSK demodulator, for example. The demodulated output is thence supplied to the subscription data memory 40 in the control unit 35 (FIG. 3).

The FSK signal entered in the subscription data memory 40 has a format indicating the FSK demodulated data as shown by (a) in FIG. 7B.

Figure 7A:
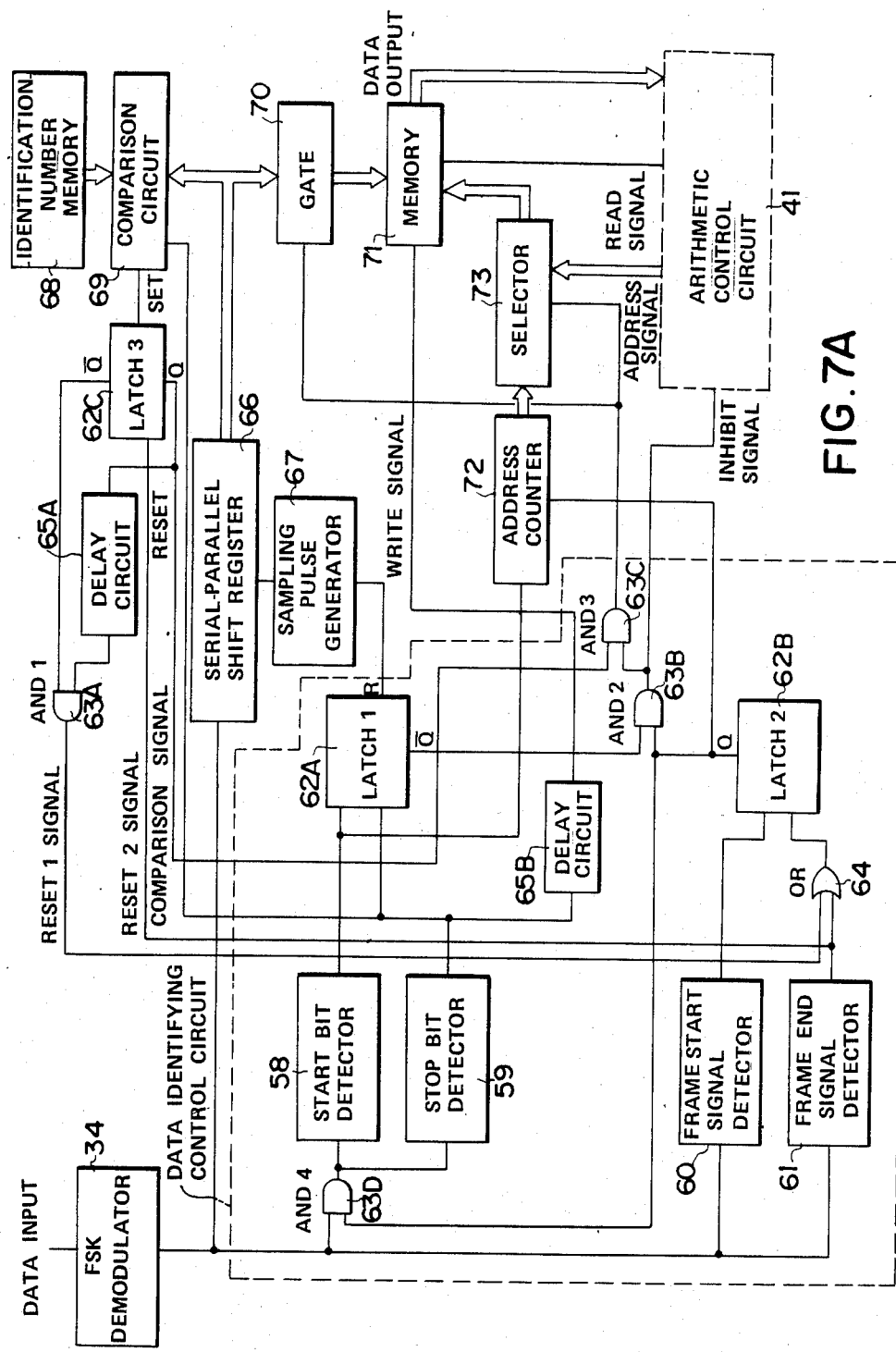
FIG. 7A is a block diagram of a subscription data memory in the control unit of FIG. 3.

FIG. 7A shows an arrangement of the subscription data memory 40. During receipt of the demodulated signal, a frame start signal detector 60 detects a frame start signal S shown by (b) in FIG. 7B and gives it to a second latch 62B to hereafter maintain the output level thereof at active logic "1" as shown by (d) in FIG. 7B. Provided the duration of the frame start signal S is selected to be shorter than that of the frame end signal E, these signals are readily detected by detectors which are one-shot timers, for example. In this case, the timers are adopted to have different time responses corresponding to the durations of the frame start and end signals, respectively, so that the frame end signal detector 61 is never actuated by the frame start signal S which will also enter therein.

The second latch 62B activates a start bit detector 58 to detect the start bit ST, which is shown by (e) in FIG. 7B and which follows the frame start signal S, and apply it to a first latch 62A.

The first latch 62A produces a Q output of logic "1" and actuates a sampling pulse generator 67 to produce an output shown by (h) in FIG. 7B. A serial-parallel shift register 66 is controlled thereby to effect a serial operation accepting the demodulated data from the FSK demodulator 34.

A stop bit detector 59 detects the stop bit SP which follows the data D, and the first latch 62A is reset concurrently. Due to this, the sampling pulse generator 67 produces an inhibit signal shown by (i) in FIG. 7B.

A comparator 69 simultaneously receives a comparison signal from the stop bit detector 59 and compares the demodulated data entered in the register 66 with the data (identification number of the outstanding signal distributer 30) entered from an identification number memory 68. If both signals do not agree, the comparator applies the comparison signal delayed by a delay circuit 65A and the comparison signal not delayed to a first AND circuit 63A via a third latch 62C. The first AND circuit 63A produces a first reset signal to reset the first and second latches 62A and 62B to initialize the circuit. The series of the said operations after detection of the frame start signal is repeated unless the signals are acknowledged to be identical.

If both signals coincide, the third latch 62C produces an output shown by (j) in FIG. 7B.

The subsequent start bit ST leading the next word of the demodulated data is also detected by the start bit detector 58 to cause the shift register 66 to serially load the demodulated data therein. The succeeding stop bit SP detected by the stop bit detector 59 resets the first latch 62A so that the $\overline{Q}$ output thereof is changed to logic "1". Therefore, a selector 73 which has been controlled by an outer or external address signal is switched to an address counter 72 via second and third AND circuits 63B and 63C (the Q output of the third latch 62C is already changed to logic "1") so that the selector 73 is controlled by an inner or internal address signal. Thereafter, the selector 73 is alternately controlled by the inner and outer address signals as shown by (k) in FIG. 7B.

The address counter 72 has been set at a given value by the preceding start bit detection.

The address for a memory 71 in the subscription data memory 40 is selected by the address counter 72 via the selector 73, and the memory 71 receives the data from the shift register 66 via a gate 70 controlled simultaneously therewith.

In this state, a write signal based on the stop bit detection signal and delayed a given time by the delay circuit 65B makes the memory 71 store the data from the shift register 66 in a given position therein. This series of operation is repeated every time one unit of data accompanied by one start bit and one stop bit is entered.

When the frame end signal E is entered after the final unit of the demodulated data, as shown by (a) in FIG. 7B, the frame end signal detector 61 detects it and resets the second latch 62B as shown by (d) in FIG. 7B. Thus the circuit is initialized.

The inhibit signal (i) in FIG. 7B is used as a flag signal to prohibit access by the arithmetic control circuit 41 (FIG. 3) while the subscription data memory is in communication with the signal generating center 10, and it is essentially produced after detection of the stop bit SP of one unit of data and before detection of the start bit of the next unit data. In FIG. 7B, the inhibit signal (i) is also produced after detection of the stop bit of one unit of data and before detection of the start bit of the next unit of data. However, this is simply an example.

The comparator 69 in the preceding description is adapted to compare the data from the identification number memory 68 with all the demodulated data. However, the identification number may comprise material completely different from the other data (several bits of the data may be designated for use as a marker) so that only a part of the data is compared.

With all the preceding control operations, the subscription data memory 40 stores the data about subscriptions of the subscribers belonging to the group of the outstanding signal distributor 30.

Figure 9A:
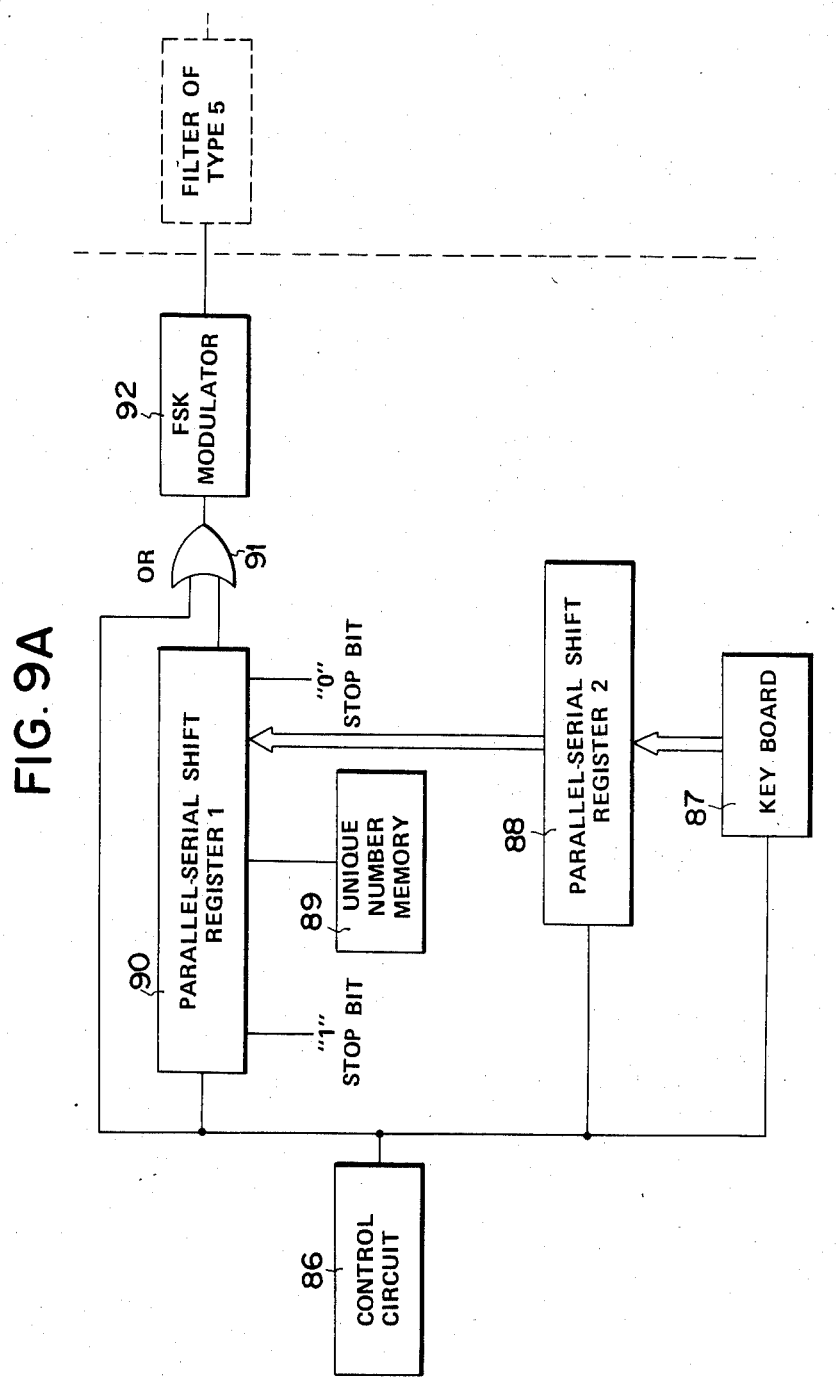
FIG. 9A is a block diagram of a tuning signal generator in the second type subscriber device of FIG. 4.

(2) Tuning Operation by a Subscriber:

A subscriber can tune its television receiver at the subscribed pay channel by operating a corresponding tuner (82A–82M) in the subscriber device (81A–81M) in the subscriber system 80. The second type subscriber device 82B, for example, is operated by controlling tuning signal generators 85A and 85B. FIG. 9A shows an essential arrangement of the tuning signal generator 85, and FIG. 9B shows timing relations between various operations therein. Assume now that the operation is established by entering a data of a predetermined number of digits and subsequently effecting a "start" operation. In the timing chart of FIG. 9B, the data comprises two digits for a better understanding. Referring to FIG. 9A, when the first digit $D_1$ is entered in a key board 87 as shown by (a) in FIG. 9B, the first data input signal is supplied from the key board 87 to a control circuit 86 which subsequently gives a second parallel-serial shift register 88 a load pulse shown by (c) in FIG. 9B. Assuming that the second shift register 88 has been controlled to effect a parallel load operation, the control circuit 86 subsequently controls the second shift register 88 to effect a serial operation as shown by (d) in FIG. 9B and in particular supplies a predetermined shift pulse as shown by (e) in FIG. 9B. As the result, the data entered through the key board 87 is stored in a predetermined position in the second parallel-serial shift register 88.

When the second digit $D_2$ of the data is entered as shown by (a) in FIG. 9B, the control circuit 86 supplies the second shift register 88 with a corresponding load pulse shown by (c) in FIG. 9B to store it therein. The circuit is arranged to not effect the parallel-to-serial control nor the shift pulse generation at this time. This is readily established by selecting an arrangement to simply enter a data of two digits.

In receipt of a start signal shown by (b) in FIG. 9B, the control circuit 86 supplies a load pulse shown by (f) in FIG. 9B to a first parallel-serial shift register 90 so as to effect a parallel operation. Thus the first register 90 stores a stop bit, the identification number, the data from the second shift register 88 and a start bit. The position in the first shift register 90 for entering the output from the second register 88 is predetermined to establish the data format. Responsively to the load pulse (f), the control circuit 86 supplies an OR gate 91 with a signal of logic "1", and thereafter controls the first shift register 90 to effect a serial operation as shown by (g) in FIG. 9B and in particular produces shift pulses at a given interval as shown by (h) in FIG. 9B. Thus the first shift register 90 supplies the data shown by (i) in FIG. 9B to the OR gate 91 which subsequently generates an output as shown by (j) in FIG. 9B.

The output from the OR gate 91 is FSK modulated by an FSK modulator 92, for example. The modulated output is sent out from the tuner 81B (FIG. 4) via a fifth filter 31H or 31J and a distributor 84A (here operative as a synthesizer) to the cable 4B and thence to the signal distributor 30. The upstream for the data transmission channel and the downstream for the television signal channel between the cable 4 and the signal distributor 30 are shown by (b), (c) and (d) in FIG. 10. The fifth filters are adapted to transmit this data transmission channel.

Figure 8A:
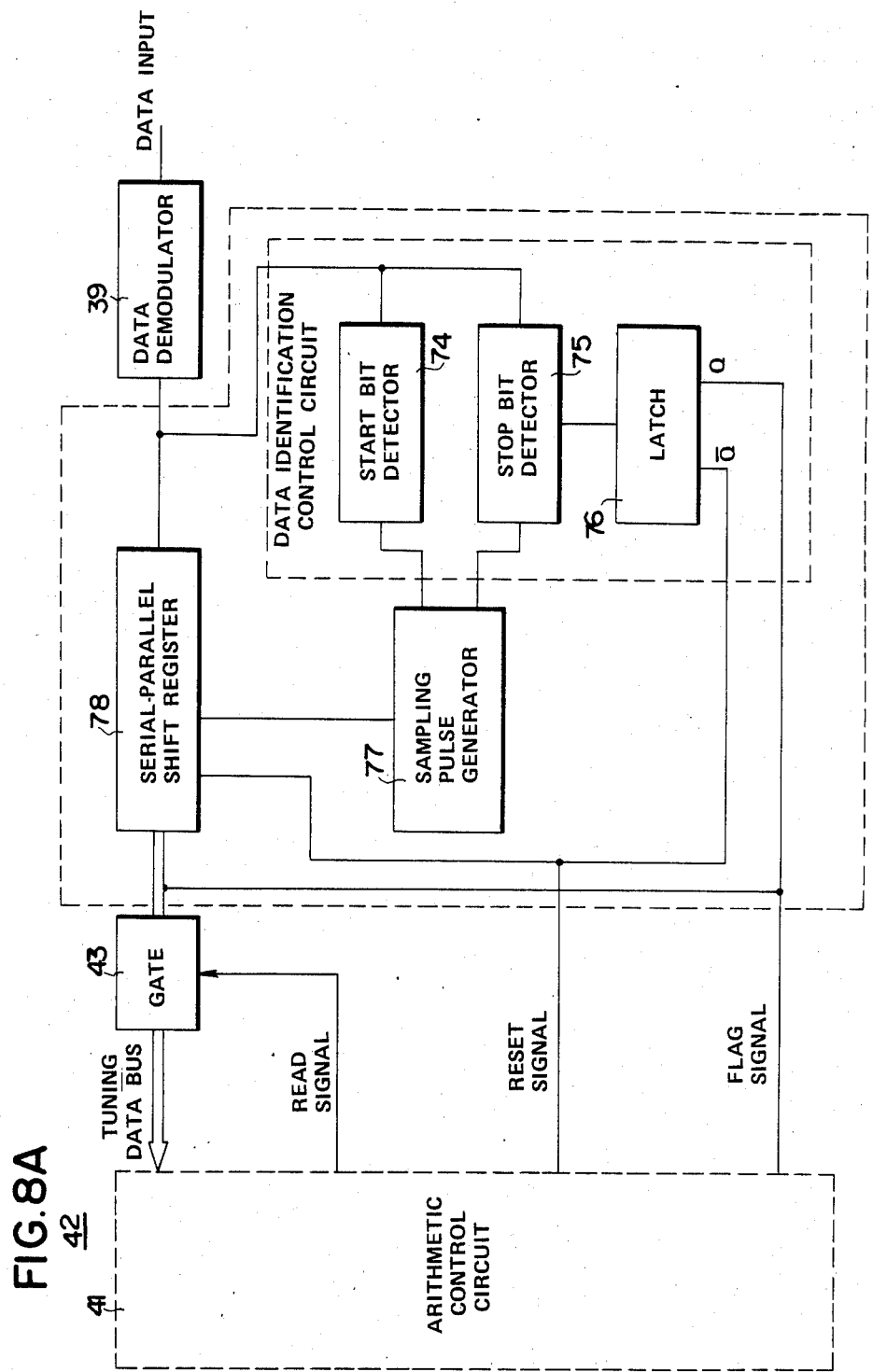
FIG. 8A is a block diagram of a tuning data memory in the control unit of FIG. 3.

When the FSK modulated data is entered in the signal distributor 30, it is transmitted to a data demodulator 39B (FIG. 2) via a fourth filter 31F in the corresponding second type subscriber unit 33B, and is demodulated there. The demodulated data is entered and stored in a corresponding tuning data memory 42B in the control unit 35. FIG. 8A shows an exemplary arrangement of the tuning data memory 42, and FIG. 8B shows a relation between various operations thereof.

The output signal from the data demodulator 39 takes a form shown by (a) in FIG. 8B which corresponds to the format shown by (a) in FIG. 7B. The start bit ST in the data signal obtained therefrom is primarily detected by a start bit detector 74 in FIG. 8A. Responsively thereto, a sampling pulse generator 17 produces sampling pulses at a predetermined interval and applies them to a serial-parallel shift register 78 to have it store the data signal serially entered from the data demodulator 39.

Subsequently, a stop bit detector 75 detects a stop bit SP shown by (d) in FIG. 8B and causes the sampling pulse generator 77 to stop its operation. Concurrently, a latch 76 generates a Q output (flag signal) of logic "1" shown by (e) in FIG. 8B and cooperates with the shift register 78 to synthesize a tuning data as shown by (h) in FIG. 8B. The flag signal (Q signal) takes a predetermined position in the data. The flag signal gives the arithmetic control circuit 41 (FIG. 3) a sign indicating that the tuning data has been stored in the tuning data memory 42 associated with the operated tuner 82.

With these control operations, the tuning data from the subscriber system 80 is properly stored in the tuning data memory 42.

(3) Control of Tuning Operation:

The preceding paragraphs described the control operations for storing respective given data in the subscription data memory 40 and in the tuning data memory 42.

Figure 11A:
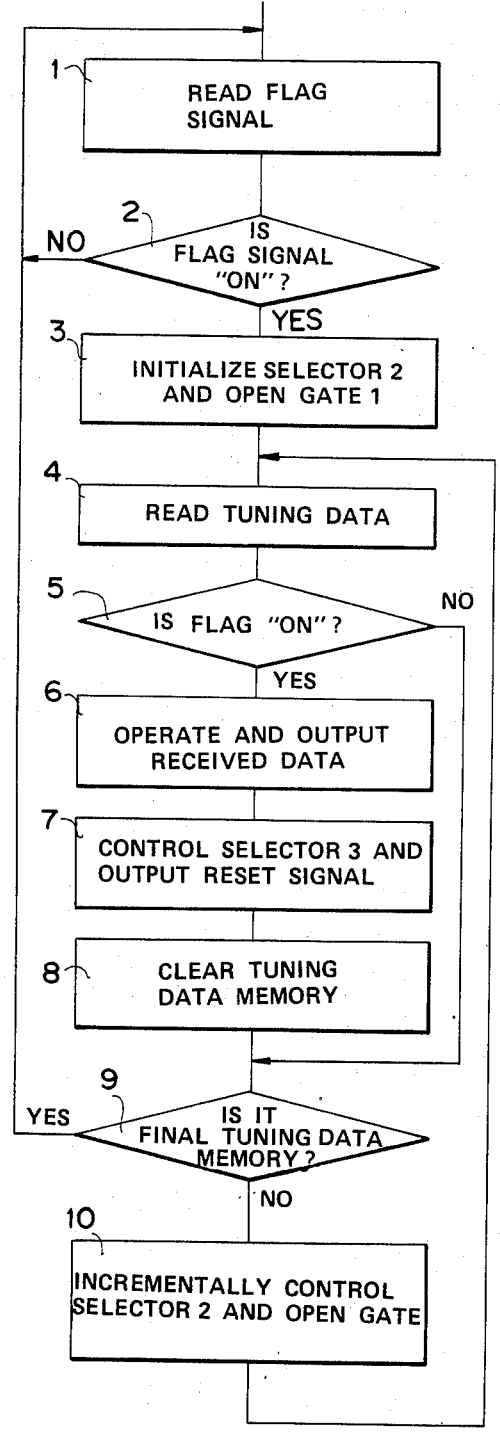
FIG. 11A is a flowchart of various operations in the control unit of FIG. 3.
Figure 11B:
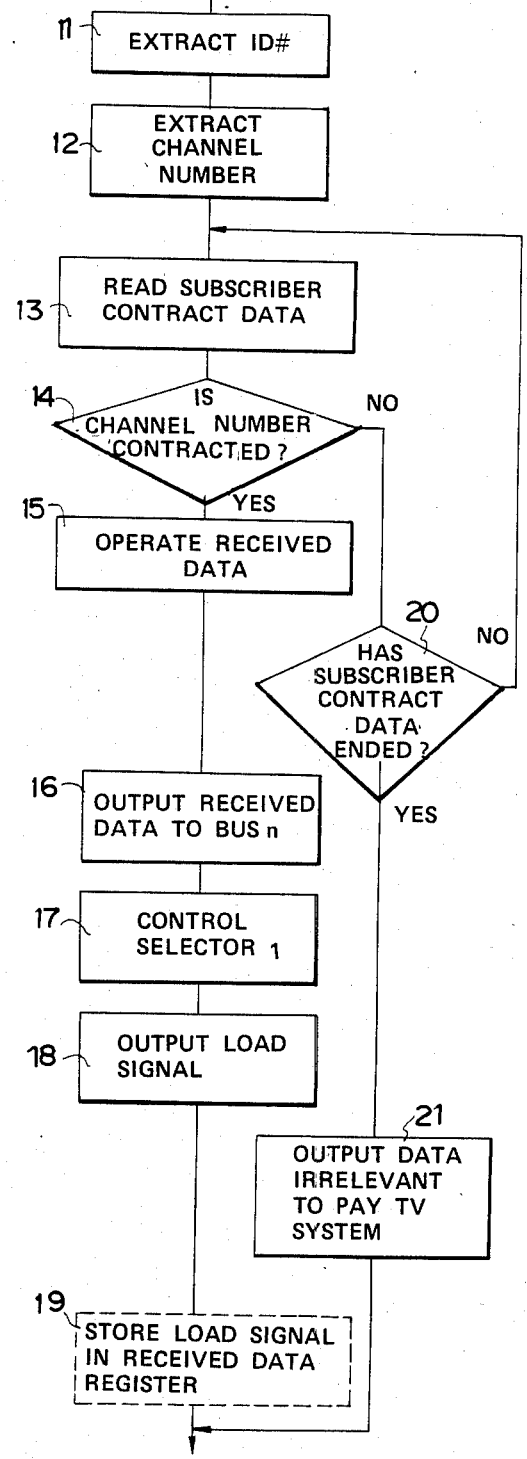
FIG. 11B is a flowchart of detailed operations in step (6) of FIG. 11A.

This paragraph deals with operations of the arithmetic control circuit 41 in the control unit 35, referring to flow charts of FIGS. 11A and 11B. FIG. 11B shows detailed steps taken in step (6) of FIG. 11A.

The arithmetic control circuit 41 normally checks whether the flag signal from the tuning data memory 42 exists (logic "1") or not (logic "0") as shown in FIGS. 3 and 8A.

The flag signal is supplied from each tuning data memory 42 of the corresponding subscriber unit 33, is combined in the OR gate 45, and the output of gate 45 is entered in the arithmetic control circuit 41. When another data memory 42 also stores a data, the flag signal becomes logic "1" to call the operations in steps (1) and (2).

With the flag signal of logic "1", the YES circuit is activated to call the operation in step (3). Namely, the second selector 44B (FIG. 3) is initialized so as to supply the read signal ((f) in FIG. 8B) to the first gate 43A to open it. Subsequently, the tuning data (h) in FIG. 8B is put on the tuning data bus in FIG. 8A so that the arithmetic control circuit 41 reads the tuning data in step (4) of FIG. 11A. In step (5), the circuit checks whether the flag signal exists or not in the tuning data. If no flag signal is detected, the operation is jumped to step (9) to check whether it is the final tuning data memory or not. In this case, it is not the final data memory. Therefore the operation is succeeded by step (10) via the NO line. In step (10), the arithmetic control circuit 41 controls the second selector 44B to open the next second gate 43B to call the operation in step (4).

If the flag signal is detected in step (5), the stream flows to step (6) via the YES line, and the arithmetic control circuit 41 effects a predetermined processing of the selected data and a predetermined control of the subscriber unit. In step (7), the circuit controls the third selector 44C to produce the reset signal ((i) in FIG. 8B) and thereby reset the latch 76 and the serial-parallel shift register 78 in the tuning data memory 42 (FIG. 8A). In step (9), it is checked whether the tuning data memory is the final one or not. Since it is not the final memory here, the NO line is activated to invite the above-described subsequent operations. When the check in step (9) acknowledges after some checking operations that the tuning data memory is final, the stream is returned back to step (1). The return to step (1) is also effected when no flag signal is detected in step (2).

Referring now to FIG. 11B, a detailed explanation is given hereunder as to operations subsequent to the answer "YES" in step (5).

The step (5) is succeeded by steps (11) and (12) where the identification number and the channel number are extracted from the entered data. In step (13), the circuit scans the memory 71 of the subscription data memory 40 (FIG. 7A) to search for whether the same channel number is associated with the same identification number therein. If the selected channel number is found in the subscription data for the identification number, the step (14) is succeeded by step (15) via the YES line where the received data for the selected channel is operated on and then is put on the data bus in step (16). A data table memory may be provided so that a desired data is extracted therefrom instead of performing the operation. In the subsequent steps (17) and (18), the circuit controls the first selector 44A (FIG. 3) to supply a corresponding converter unit 36 (FIGS. 2 and 5) with a load signal.

Figure 5:
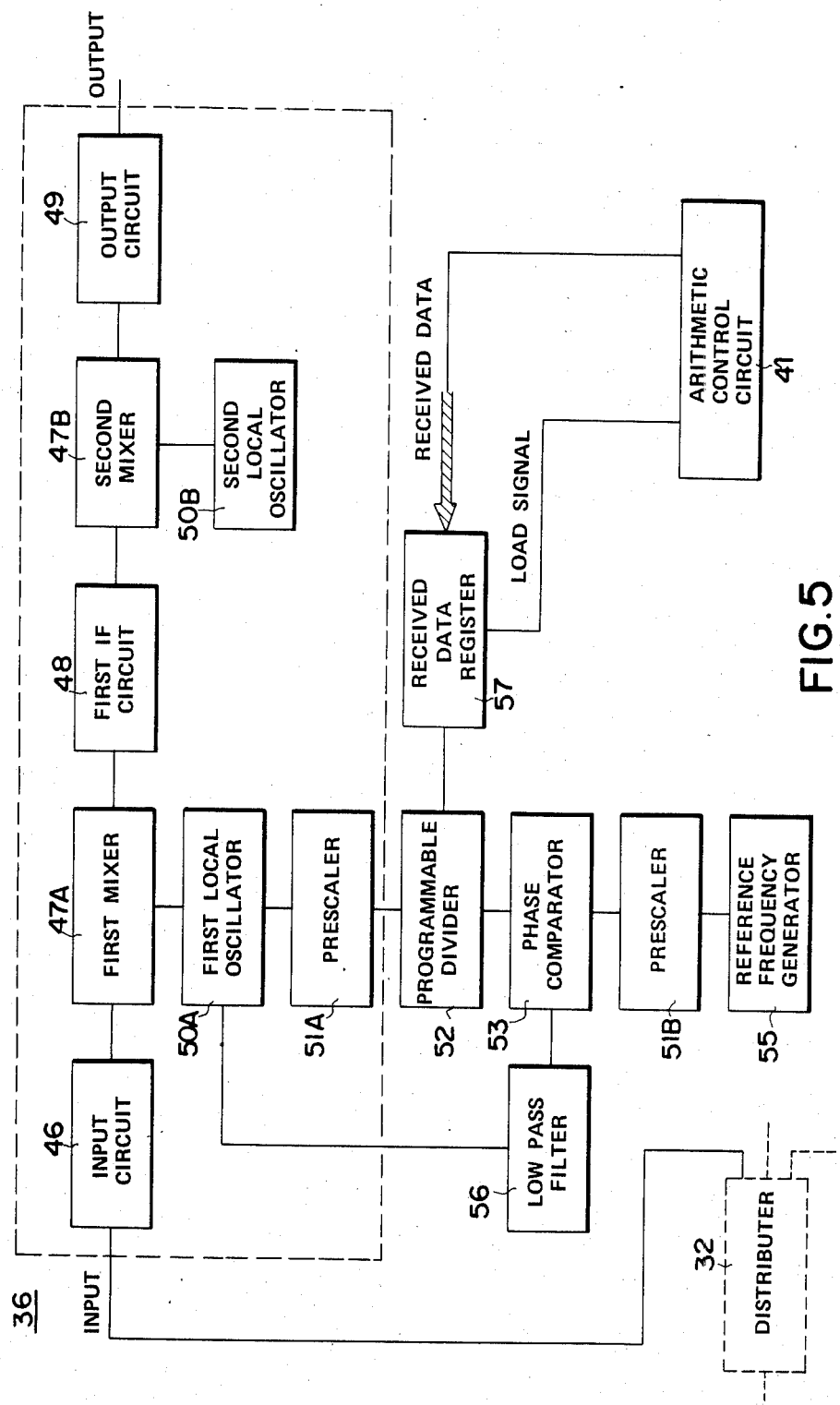
FIG. 5 is a block diagram of a converter unit in the subscriber unit of FIG. 2.

Referring to FIG. 5, the load signal causes the data to be stored in a reception data register 57 in the converter unit 36.

If the selected channel is not found in the subscription data for the outstanding identification number (this means that the selected channel is not subscribed to by the subscriber), the step (14) is succeeded by step (20) via the NO line to check whether all the necessary subscription data is scanned or not. If the answer is "NO", the circuit comes back to step (13) to repeat the operations in steps (13) and (14). If the answer is "YES", the step 20 is succeeded by step (21) to control the system to supply a data excluded from pay television system or to not supply any data.

(4) Output and Reception of the Selected Television Signal:

When the reception signal is entered and stored in the reception data register 57 in the converter unit 36 (FIG. 5), the converter unit 36 converts the television signal of the selected channel into a television signal in a predetermined frequency band and applies it to a corresponding filter 31.

The converter unit 36 may be a double-conversion electronic converter of a known PLL synthesizer type. Its operation is not explained here. In FIG. 5, reference numeral 46 designates an input circuit, 47 is a mixer, 48 is an intermediate frequency amplifier, 49 is an output circuit, 50 is a local oscillator, 51 is a prescaler, 52 is a programmable divider, 53 is a phase comparator, 55 is a reference frequency generator, and 56 is a low pass filter.

The first type converter unit 36B converts the requested television signal into a television signal in a frequency band CH-A whereas the second type converter unit 36C converts the requested television signal into a frequency band CH-B. These controls are readily effected by changing the oscillation frequency of the local oscillator 50B (second local oscillator).

Taking the second type subscriber device 81B, the following is an explanation of how to simultaneously provide the subscriber with different signals of the pay channels subscribed to for the respective television sets when the respective two tuners 82B and 82C are operated in parallel.

With the first type tuner 82B being first operated to receive the subscribed channel, a tuning signal including the identification number unique thereto is applied to the control unit 35 via the second type subscriber unit 33B in the signal distributor 30. Thereby a reception data corresponding to the selected channel number is applied to the first type converter unit 36B in the second type subscriber unit 33B (FIG. 2) and is stored in the reception data register 57 (FIG. 5). Subsequently the requested television signal is converted to a television signal in the frequency band CH-A and is supplied from the converter unit 36B. The third type filter 31E connected to the first type converter unit 36B is adapted to transmit at least the television signal channel as shown by (b) in FIG. 10. Therefore, the television signal channel in the form shown by (c) in FIG. 10 is supplied to the second type subscriber device 81B.

The first type filter 31G (FIG. 4) in the subscriber device 81B is adapted to transmit only the television signal in channel A (CH-A). Thus the first type television receiver 83B tuned at the channel CH-A can receive the television signal of the channel CH-A.

The second type filter 31I is adapted to transmit only the television signal of the channel B(CH-B), the second type receiver 83C cannot receive the television signal of the channel CH-A even if this channel is requested.

With the second type tuner 82C being operated in parallel to also receive the subscribed channel, a tuning signal including the identification number unique thereto and different from that of the first type tuner 82B is supplied and processed in the same manner as described above so that the reception data register 57 in the second type converter unit 36C (FIG. 2) stores a corresponding reception data. Thereby, the selected television signal is converted to a television signal of the channel CH-B by the second type converter unit 36C and is supplied to the synthesizer 38.

The synthesizer 38 unites the television signals of the channel CH-A and CH-B and supplies the sum signal in the form shown by (d) in FIG. 10 to the second type subscriber unit 81B via the third type filter 31E.

The television signal of the channel CH-A in the entered sum signal is transmitted by the first type filter 31G to the first type receiver 83B. The television signal of the channel CH-B in the entered sum signal is transmitted by the second type filter 31I to the second type receiver 33C.

With the arrangement of the invention described above, the subscriber device for one subscriber is connected to the signal distributer by a single cable regardless of the number of different television receivers included in the subscriber device, provided the cable connection to the subscriber unit is made to the corresponding type of the subscriber unit. This decreases the expense for cable connection.

Further, each subscriber device cannot receive the channel he selected unless it is acknowledged that the selected channel is certainly subscribed to by the subscriber. Therefore, the invention system has a high security against nonsubscribers.

The embodiments of the invention in which an exclusive property or privilege is claimed are defined as follows:

1. A pay television system, comprising:
a signal generating center having television signal transmitter means for producing a television signal which includes a plurality of different channel signals corresponding to respective television channels, control signal transmitter means for producing a control signal which includes subscription information identifying which of said channel signals each of a plurality of subscribers is permitted to receive, and an adder which combines said television signal and said control signal into a combined signal;

a signal distributor, and a first cable which connects said signal generating center to said signal distributor and carries said combined signal from said signal generating center to said signal distributor, said signal distributor having a first filter which separates said television signal from said combined signal, a second filter which separates said control signal from said combined signal, at least one subscriber unit which receives said television signal from said first filter, and at least one control unit which receives said control signal from said second filter; and a subscriber device, and a second cable connecting said signal distributor to said subscriber device, said subscriber device having first and second tuners which each correspond to a respective subscriber and which can each transmit to said signal distributor across said second cable a respective tuning signal identifying the corresponding subscriber and identifying a television channel selected by the subscriber, said subscriber device further having first and second television receivers coupled to said second cable, respectively tuned to first and second predetermined television channels which are different, and respectively associated with said first and second tuners;

wherein said subscriber unit includes a first converter unit which corresponds to said first tuner and can frequency convert a selected one of said channel signals from said television signal into a first frequency converted signal in a first predetermined frequency band corresponding to said first predetermined television channel, a second converter unit which corresponds to said second tuner and can frequency convert a selected one of said channel signals from said television signal into a second frequency converted signal in a second predetermined frequency band corresponding to said second predetermined television channel, and a third filter which transmits said first and second frequency converted television signals across said second cable to said subscriber device, said first and second frequency converted signals from said second cable being respectively applied to said first and second television receivers; and wherein said control unit includes means responsive to receipt of each said tuning signal for checking said subscription information from said control signal in order to determine whether the subscriber identified in each tuning signal is permitted to receive the channel identified in such tuning signal and, when said control unit determines that the identified subscriber is permitted to receive the identified channel, for causing a respective one of said converter units corresponding to the tuner which produced such tuning signal to carry out said frequency conversion using one of said channel signals which corresponds to the channel identified in the tuning signal.

2. The pay television system of claim 1, wherein each said tuner includes tuning signal generator means for generating a respective said tuning signal each time a channel is selected using such tuner, and includes a fourth filter which transmits the tuning signal across said second cable to said subscriber unit.

3. The pay television system of claim 1, wherein said control unit includes a subscription data memory which stores said subscription information from said control signal, a tuning data memory which stores tuning data from each said tuning signal received from said subscriber device, and an arithmetic control circuit which compares the tuning data stored in said tuning data memory with the subscription information stored in said subscription data memory in order to determine whether the subscriber identified in the tuning data is permitted to receive the channel identified therein.

* * * * *